(No Model.)
N. G. DAVIS.
SEAM PRESSING ATTACHMENT FOR SAD IRONS.
No. 524,133. Patented Aug. 7, 1894.
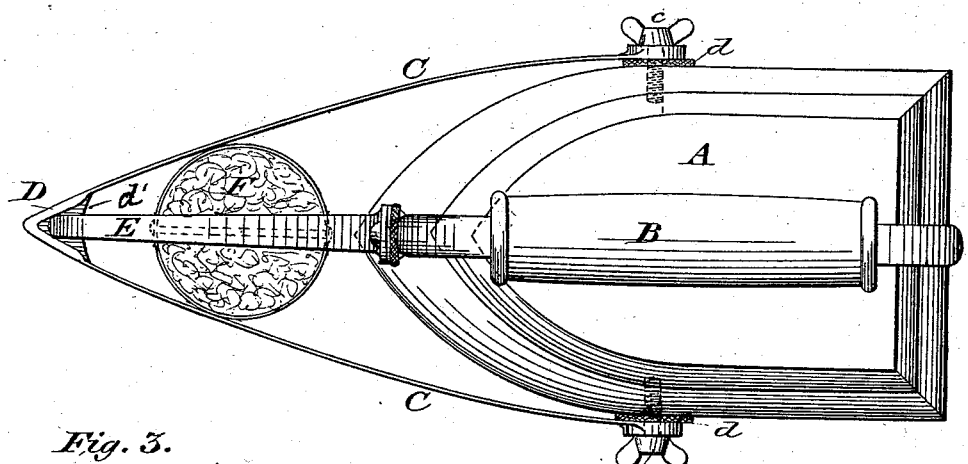
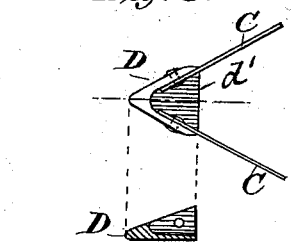
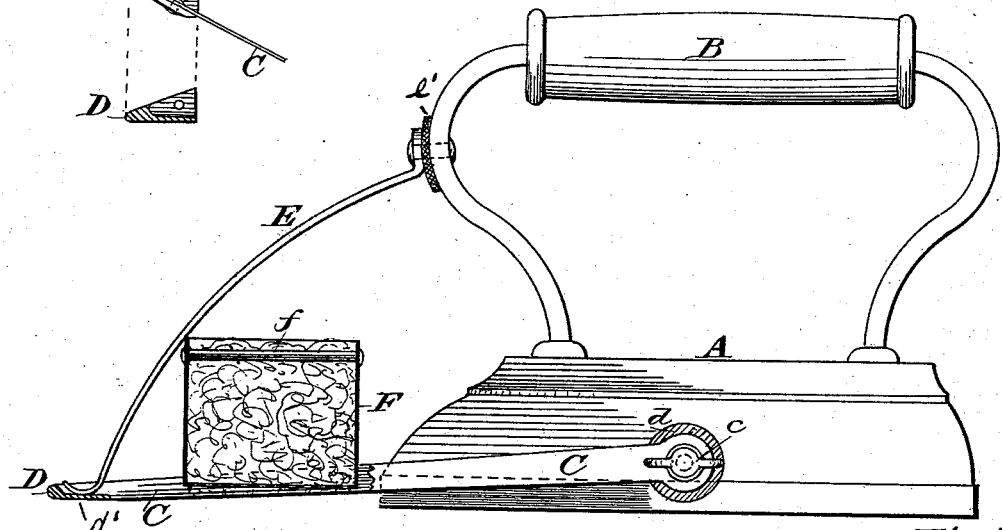
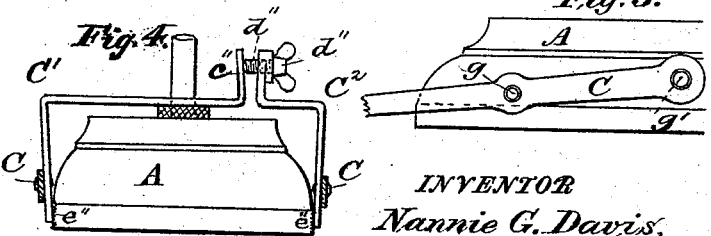
WITNESSES
INVENTOR
Nannie G. Davis,
By T. C. Brecht,
Attorney

UNITED STATES PATENT OFFICE.

NANNIE GUY DAVIS, OF WASHINGTON, DISTRICT OF COLUMBIA.

SEAM-PRESSING ATTACHMENT FOR SAD-IRONS.

SPECIFICATION forming part of Letters Patent No. 524,133, dated August 7, 1894.

Application filed September 4, 1893. Serial No. 484,732. (No model.)

*To all whom it may concern:*

Be it known that I, NANNIE GUY DAVIS, a citizen of the United States, residing at Washington, in the District of Columbia, have invented certain new and useful Improvements in Seam-Pressing Attachments for Sad-Irons; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in seam-pressing attachments to sad- or flat-irons for flattening the seams of wearing apparel, such as dresses, skirts, &c.

It is a well-known fact that ladies, dressmakers, and others, have always great trouble in opening and pressing the seams of dresses and other articles of wearing-apparel, and to produce a device, by which this can be done in a convenient and rapid manner, is the object of my invention; also to produce an attachment for sad or flat-irons, by which the seams of dresses, &c., can be opened, dampened and pressed at one and the same operation; also to make the device readily attachable and detachable; furthermore to employ the device with old as well as new sad-irons; and finally to produce the devices, so that they can be bought in open market at a very reasonable cost.

My invention consists in the construction of certain details and arrangement of parts, as will be more fully described hereinafter and specifically pointed out in the claims, reference being had to the accompanying drawings, and the letters marked thereon.

Like letters indicate similar parts in the different figures of the drawings, in which—

Figure 1 represents a plan or top view of a sad iron with my attachment in position. Fig. 2 is a side elevation of the same, partly in section. Fig. 3 is a detail plan and section of a modified form of the plow for the attachment. Fig. 4 is a view showing a modification of the means employed for attaching the plow to the iron, and Fig. 5 shows another modification for the same purpose.

In the drawings, A, represents a sad-iron, of any suitable construction and size, having a handle B. To each side of the lower part of this sad-iron, an arm C of iron or steel is attached, by means of a thumb-screw $c$, which is screwed into a properly tapped hole in the sad-iron. These two arms C are preferably made flat and thin, so that they are light and yet stiff and rigid. They converge at the forward end and form, what I term, the plow D, made of wire or its equivalent, which can be flattened or reduced between the sides. This plow can be cast of brass or iron, or other suitable material, and the bars C secured to it by rivets, as shown in Fig. 3. Said plow may be stamped out of one piece, and the bars secured to it. A spring E is attached to one of the arms of the handle, and bears on the reduced part $d'$ of the plow, to keep it down, when in use. To prevent the heat from the iron being conveyed through the spring, a piece of asbestus cloth $e'$ or its equivalent, is placed under the place of attachment of said spring. Similar pieces $d$ may be placed under the bars C, at the point, where they are attached to the iron.

Immediately back of the plow, a cup F is secured to the bars C, with its lower edge slightly raised above the lower face of the plow. Its bottom consists of wire-gauze or reticulated metal, to permit water to trickle through. A sponge is placed in the cup to absorb the water, and prevent spilling or running through too freely, and serving to dampen the seams. A small wire or rod $f$ is arranged across the upper part of the cup to prevent the sponge from coming out, when swelling from moistening, but a cover may be used, if desired. The cup may be round, square, or it may be of any other shape. The cup may be made of brass, copper, galvanized sheet metal, or other suitable material.

The plow and bars, as well as the spring may be nickel-plated, bronzed, or painted, to prevent rusting.

In the modification, shown in Fig. 4 the bars C are held by the pieces C' and C² bent as shown, to extend over the sides of the flat iron A, and clamped by the screw $d''$ bearing against the ear $c''$, and pressing the ends of the pieces C' and C² against the roughened surfaces $e''$ on the sides of the iron A, and said surfaces may be cast on or made afterward. Said bars C are secured to the bent bars C' and C² by rivets or their equivalents.

In the modification shown in Fig. 5, the bars C are provided with eyes, which are passed over the pins $g$ and $g'$, preferably cast in place in the sad-iron A. Said bars are sprung over the pins, as there is enough elasticity in them to do so.

Many other ways to apply this attachment to the iron, would suggest themselves to the skilled mechanic, and I do not limit myself to those here shown.

The operation is as follows: When it is desired to use the attachment, the bars C are first attached to the sides of the sad iron A, and the spring E attached to the handle is turned to bear on the plow D. The sponge in the cup F is then saturated with water, and the pressing of the seams can be proceeded with. The plow will serve to spread the seams apart, and the water in the cup will dampen them, and the iron then passing over them will finish the operation with its heat. When finished, the attachment can be readily detached, until again required for use.

Having thus described my invention, what I claim is—

1. A pressing-attachment for sad irons, consisting of two bars, provided with a plow for opening the seams, and a sponge-cup with water, for dampening them attached thereto, substantially as shown and specified.

2. The combination of two bars C, attached to a sad iron by thumb-screws, and having a plow D for spreading the seams, with a sponge-cup F and a spring E, all arranged as and for the purpose specified.

3. The combination of the two bars C, attached to a sad-iron, and having non-conducting material $d$ between its points of attachment, and provided with a plow D, with a spring E and non-conducting material $e'$, all substantially as and for the purpose set forth.

4. The combination with a sad iron of an attachment, having a plow for opening the seams, and a sponge-cup for dampening them, and a spring for pressing down the plow, all arranged as set forth.

5. An attachment for sad irons, having a plow for the opening of the seams, and a sponge-cup for dampening them, as and for the purpose specified.

In testimony whereof I affix my signature in presence of two witnesses.

NANNIE GUY DAVIS.

Witnesses:
HENRY D. SAXTON,
LUCIUS F. RANDOLPH.